United States Patent [19]

Robbins, III

[11] Patent Number: 4,982,868

[45] Date of Patent: Jan. 8, 1991

[54] BAIL TYPE PITCHER FOR THIN WALLED CONTAINER

[76] Inventor: Edward S. Robbins, III, 459 North Ct., Florence, Ala. 35630

[21] Appl. No.: 530,418

[22] Filed: May 30, 1990

Related U.S. Application Data

[63] Continuation-in-part of Ser. No. 432,672, Nov. 7, 1989.

[51] Int. Cl.$^5$ .............................................. B65D 23/10
[52] U.S. Cl. .................................. 220/404; 220/85 H; 215/100 A; 294/31.2
[58] Field of Search ................ 220/404, 85 H, 91, 92, 220/94 R, 95, 96; 215/100 A; 294/27.1, 31.2, 33

[56] References Cited

U.S. PATENT DOCUMENTS

| | | | |
|---|---|---|---|
| D.186,555 | 11/1959 | Hunt | D58/26 |
| D.292,160 | 10/1987 | Thomas | D7/70 |
| 535,550 | 0/1895 | Müller | 215/12.1 |
| 547,713 | 10/1895 | Courtenay | 215/100 A |
| 704,972 | 7/1902 | Griffith | 215/12.1 |
| 770,528 | 9/1904 | Kestner | 215/12.1 |
| 965,629 | 7/1910 | Holz | 294/28 |
| 1,468,808 | 9/1923 | Hamilton | 215/12.1 |
| 1,702,555 | 2/1929 | Watson | 248/145.6 |
| 1,843,325 | 2/1932 | Kappelly | 215/12.1 |
| 2,088,387 | 7/1937 | Rice, Jr. et al. | 220/85 H X |
| 2,463,651 | 3/1949 | Stevens | 294/33 X |
| 2,838,226 | 6/1958 | Hartmann et al. | 229/90 |
| 2,859,891 | 11/1958 | Carkin | 215/11 |
| 2,867,364 | 1/1959 | Bramante | 224/45 |
| 2,928,570 | 3/1960 | Fitch | 220/85 |
| 3,061,129 | 10/1962 | Fitzgerald | 215/11 |
| 3,092,277 | 6/1963 | Brim | 215/13 |
| 3,202,309 | 8/1965 | Simpson | 215/100 |
| 3,255,932 | 6/1966 | Hunter et al. | 222/183 |
| 3,402,843 | 9/1968 | Campbell | 215/100 |
| 3,606,962 | 9/1971 | Scholle | 222/105 |
| 3,610,671 | 10/1971 | Conger | 294/33 |
| 3,688,936 | 9/1972 | Killigrew | 215/100 |
| 3,756,451 | 9/1973 | Popeil | 220/96 |
| 4,300,612 | 11/1981 | Schroeder, Jr. et al. | 150/52 R |
| 4,379,578 | 4/1983 | Schuler | 294/31.2 |
| 4,486,043 | 12/1984 | Rais | 294/27 H |
| 4,511,167 | 4/1985 | Kawaguchi | 294/28 |
| 4,552,396 | 11/1985 | Rais | 294/27.1 |
| 4,653,671 | 3/1987 | Duffy et al. | 222/105 |
| 4,660,876 | 4/1987 | Weldin et al. | 294/33 |
| 4,666,197 | 5/1987 | Watson et al. | 294/31.2 |
| 4,667,359 | 5/1987 | Polotti | 294/31.2 X |
| 4,671,427 | 6/1987 | Farquharson | 222/83.5 |
| 4,896,913 | 1/1990 | Kennedy | 294/31.2 |

Primary Examiner—Steven M. Pollard
Attorney, Agent, or Firm—Nixon & Vanderhye

[57] ABSTRACT

A carrier assembly for thin walled containers is provided which includes upper and lower carrier portions. The lower portion includes an open-top bucket like member and the upper portion includes a pair of straps extending away from a container neck engaging portion. The straps may be secured to the lower carrier portion for pivotal movement between a container loading/unloading position and a container neck engaging position. A combination carrier and thin walled container assembly is also provided.

30 Claims, 5 Drawing Sheets

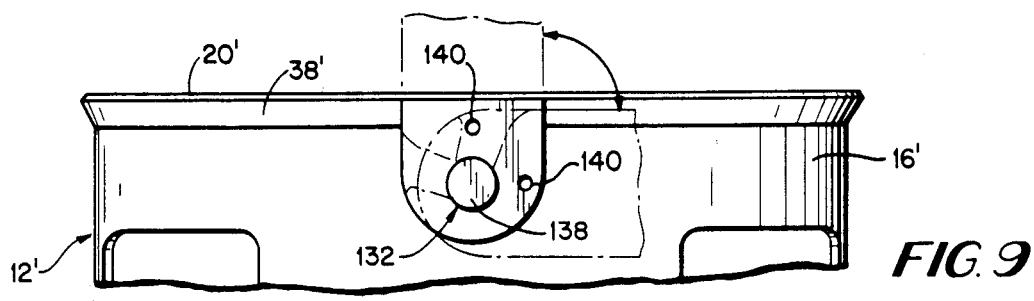
FIG. 9
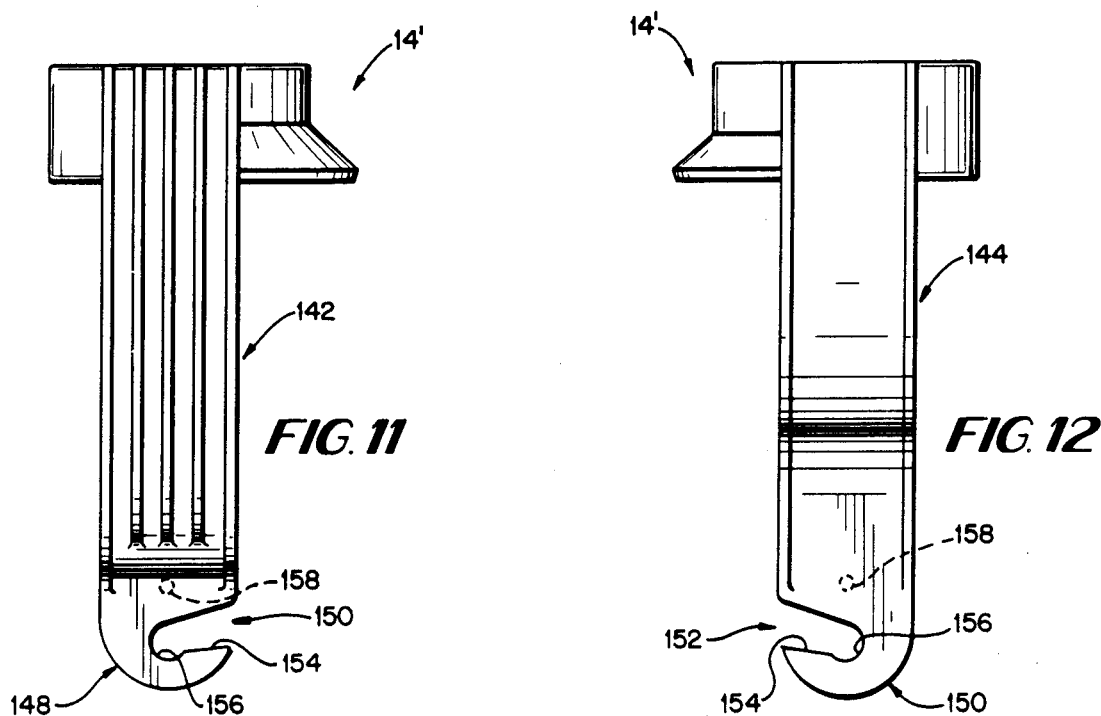
FIG. 11
FIG. 12
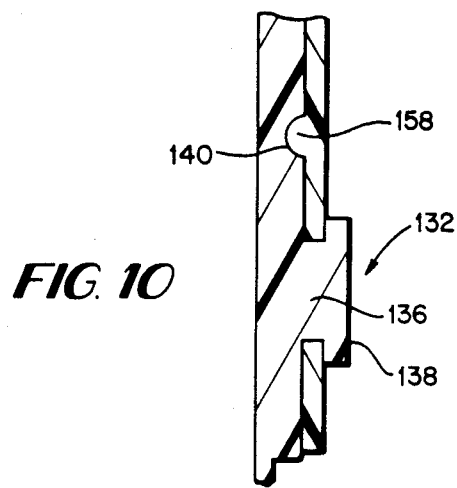
FIG. 10

BAIL TYPE PITCHER FOR THIN WALLED CONTAINER

RELATED APPLICATIONS

This application is a continuation-in-part of my earlier filed co-pending application Ser. No. 07/432,672 filed on Nov. 7, 1989, entitled "Composite Container and Associated Carrier", the disclosure of which is hereby expressly incorporated by reference.

This application is also related to my co-pending application Ser. No. , (atty. docket 300-171) filed on , and entitled Pivoting Handle Type Pitcher For Thin Walled Container.

FIELD OF THE INVENTION

This invention generally relates to thin walled, flexible and collapsible containers and associated carriers for such containers, which are useful for holding various materials, including liquid foodstuffs (milk, water, juice, etc.), other non-foodstuff liquids (dish and laundry detergent, etc.), viscous liquids and non-liquid flowable material (powders, granules, salts, etc.). More specifically, the present invention relates to a relatively rigid reusable container carrier which is adapted to receive and hold a flexible, collapsible container in nested relationship, and which enables the consumer to conveniently use and then dispose of an empty thin walled container, and replace it with a similar, filled container, or refill container.

BACKGROUND AND SUMMARY OF THE INVENTION

There is great concern in government and in the food packaging industry for potential environmental hazards associated with disposable plastic containers used in the packaging and sale of beverages such as milk, water, juice, etc., other liquids or semi-liquids (viscous liquids) such as detergents, ketchup, etc., as well as flowable non-liquids such as powders, granules, and salts, etc. It has been estimated, for example, that in the dairy industry alone, as much as 500 million pounds of plastic are required each year for consumer oriented container applications, virtually all of which eventually finds its way to landfills and/or other waste sites. Significant amounts of scrap plastic are also produced by the manufacture of such large amounts of plastic, thereby also contributing to the waste problem. The thin walled container assemblies of my above identified parent application alleviate this problem to the extent of reducing the plastic required to form, for example, a one-gallon container by about fifty percent.

In order to fully utilize the advantages of the thin walled, flexible and disposable containers as described in my above identified parent application, it is desirable to provide a carrier which will securely hold the thin walled container during use, and particularly during pouring. In other words, while the thin walled containers of my parent application are sufficiently strong as to be sold separately as replacements or refills on the shelf with no supporting carrier, the use of the container and particularly the pouring of contents therefrom is made easier and less prone to spilling, because the user need not directly grasp the flexible sidewall of the container.

In accordance with this invention, therefore, a carrier device with an integral handle is provided for receiving and holding a thin walled, flexible and collapsible container. The carrier may be a one-time purchase, or at least a seldom purchased item for the consumer, to be used repeatedly with subsequently purchased refills, while the empty thin walled container itself may be disposed of after use in the normal fashion.

In one exemplary embodiment of the invention, the carrier includes relatively rigid lower and upper portions. The lower portion includes a generally cylindrical bucket-like member including a peripheral side wall and a bottom wall. The upper end of the lower portion is open and terminates in an upper peripheral edge. An upper portion of the carrier includes a pair of elongated, relatively rigid strap portions which extend from opposite sides of a container neck engaging portion. The free end portions of the respective strap portions are provided with profiled apertures which are adapted to fit over a pair of projections extending from opposite sides of the lower portion of the carrier.

In this first exemplary embodiment, each of the projections extending from the lower carrier portion include elongated stem portions joined to the lower carrier portion at one end and provided with enlarged heads at the other end. The apertures in the upper carrier strap portions each comprise an elongated slot portion and an enlarged circular portion joined to form a single profiled aperture. This arrangement enables the strap portions to be slidably mounted over the enlarged heads of the above described projections, to thereby attach the upper carrier portion to the lower carrier portion in such a way as to permit pivotal movement of the upper carrier portion about a horizontal axis extending between the opposed projections. When the upper carrier portion has been pivoted to a container neck engaging position, the strap portions may be pulled upwardly slightly to cause locking engagement of the elongated stem portion of the projections within the elongated slot portions of the apertures, to preclude any subsequent pivoting movement of the upper carrier portion relative to the lower carrier portion.

Thus, it may be appreciated that the upper carrier portion, through manipulation of the strap portions, may be pivoted about the oppositely extending projections to permit loading and unloading of a thin walled container within the lower carrier portion. After loading of a thin walled container within the lower portion, the upper carrier portion may then be pivoted into engagement with the container neck, and thereafter pulled upwardly to insure releasable locking engagement of the upper carrier portion relative to the lower carrier portion.

In this exemplary embodiment, the container neck engaging portion of the upper carrier portion is designed to snugly engage the container neck just below an outwardly directed radial flange of the thin walled container.

The upper carrier portion also includes an integral handle portion extending between one side of the container neck engaging portion and the lower end of one of the strap portions, to thereby define a closed loop handle which facilitates lifting and carrying of the assembly, as well as pouring contents from the container.

The above described arrangement provides a unique, easy to use thin walled container carrier which is adapted for relatively permanent use, i.e., it is designed to be used repeatedly with thin walled, disposable container refills.

In another exemplary embodiment of the invention, a container carrier is provided with a lower carrier portion substantially identical to that described above. The upper carrier portion differs to the extent that one of the strap portions extending between the container engaging neck portion and the lower carrier portion is modified to serve as the handle. In addition, the bail elements are modified to assume a simpler shape, cooperable with side opening slots on the lower ends of the strap portions, enabling essentially the same type of pivoting movement as described above. Cooperable detents and projections are also provided on the lower carrier portion and strap portions, respectively, to insure that the upper carrier portion is secure in both the container neck engaging position and in the loading/unloading position.

Thus, in accordance with a broader aspect of the invention, a thin walled container carrier is provided which comprises (a) a lower carrier portion including a peripheral sidewall, a bottom wall, and an upper peripheral edge; and (b) a pivotable upper carrier portion including a pair of strap portions detachably secured at first ends to the lower carrier portion at diametrically opposed locations and terminating at a container neck engaging portion integrally formed between second ends of the strap portions.

In a related aspect, this invention relates to a combination thin walled container and thin walled container carrier assembly which comprises (a) a container carrier including a lower carrier portion having a peripheral sidewall, a bottom wall, and an upper peripheral edge; an upper carrier portion pivotably secured at first ends to the lower carrier portion at diametrically opposed locations, and including a container neck engaging portion; and a carrying handle; and (b) a flexible and collapsible container adapted to be carried by the carrier assembly and a relatively thin peripheral side wall, a bottom wall and a top wall, the top wall having an integrally formed neck portion including closure receiving means formed thereon.

Additional objects and advantages of the subject invention will become apparent from the detailed description which follows.

BRIEF DESCRIPTION OF THE DRAWINGS

FIG. 9 is a partial side elevation illustrating the pivotal movement of the upper carrier portion relative to the lower carrier portion;

FIG. 10 is a cross-sectional detail illustrating the manner in which the upper carrier portion may be releasably secured in one position of movement of the upper carrier portion;

FIG. 11 is a one side view of the upper carrier portion shown in FIG. 7; and

FIG. 12 is the other side view of the upper carrier portion shown in FIG. 7.

DETAILED DESCRIPTION OF THE DRAWINGS

Figure 1:
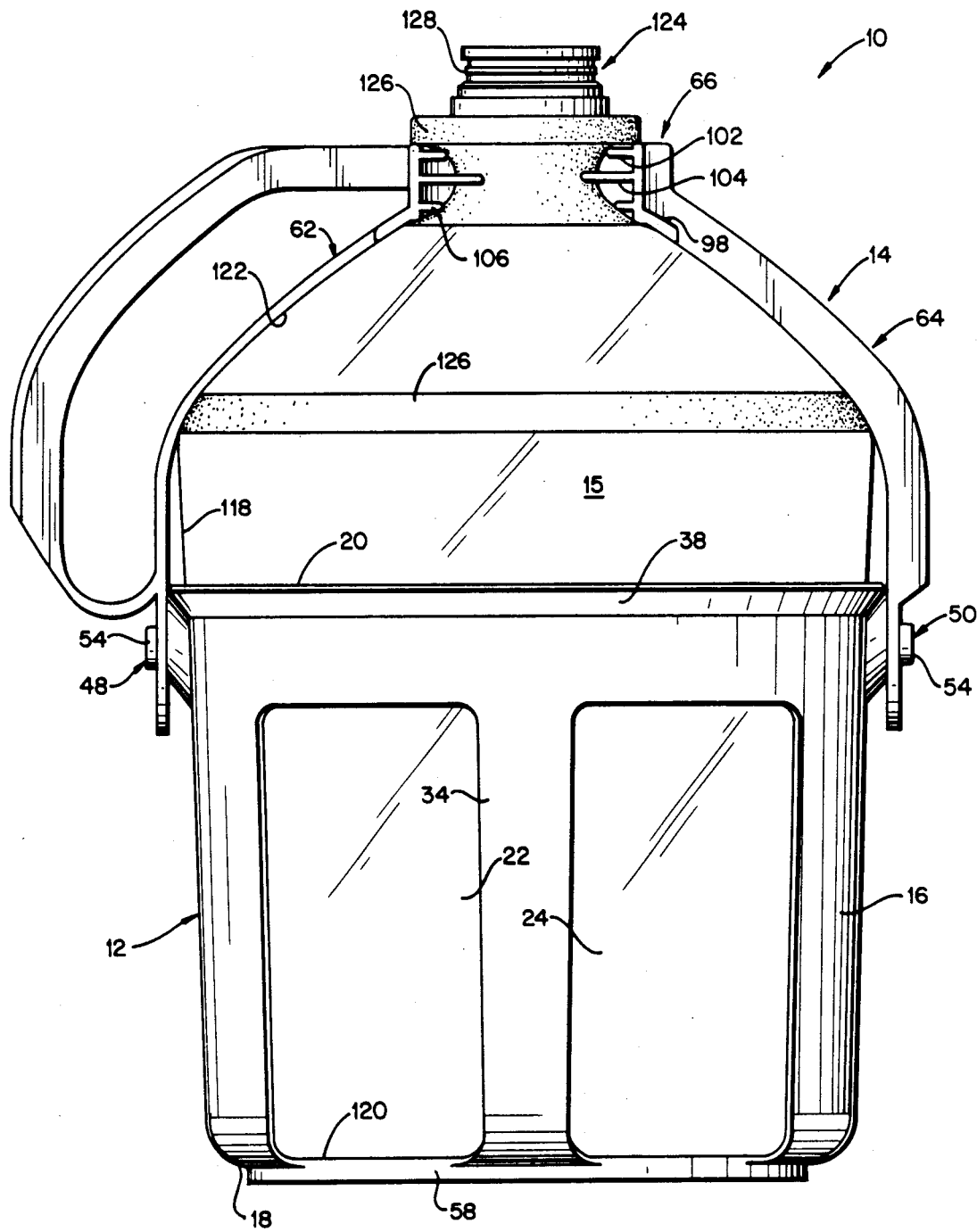
FIG. 1 is a side elevation of a carrier assembly and thin walled flexible container in accordance with one exemplary embodiment of the invention.
Figure 2:
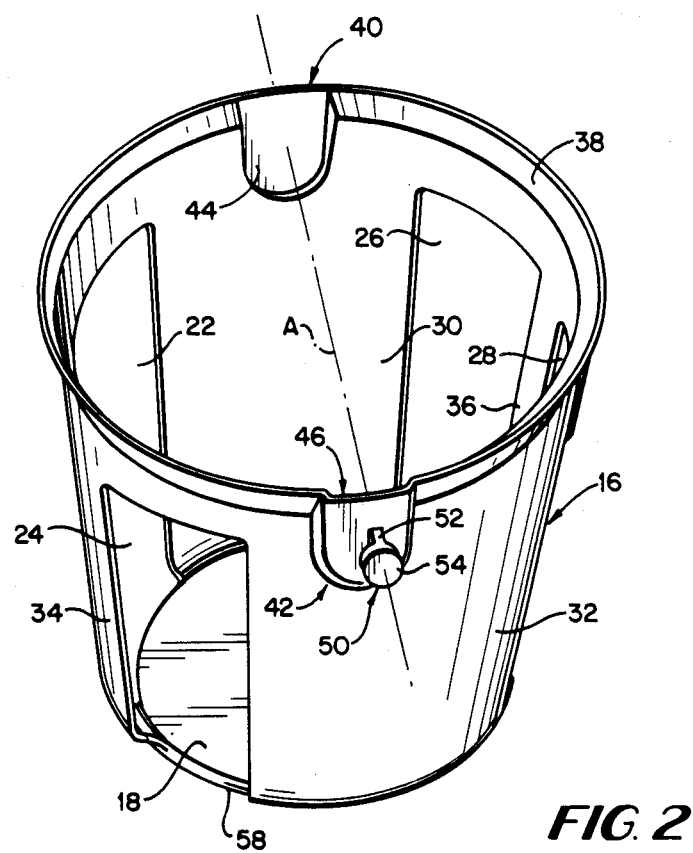
FIG. 2 is a perspective view of the lower carrier portion of the assembly shown in FIG. 1.

With reference now to FIGS. 1-6, the container carrier assembly 10 of this invention includes a lower carrier portion 12 and an upper carrier portion 14, specifically adapted to hold a thin walled flexible and collapsible container 15. The lower carrier portion 12 includes a generally cylindrical bucket-like member having a substantially cylindrical peripheral side wall 16, a bottom wall 18, and an upper annular peripheral edge 20. In order to reduce the overall weight of the lower carrier portion 12, and in order to reduce the amount and hence the cost of material required, relatively large and generally rectangularly shaped cut-outs 22, 24, 26 and 28 are provided substantially symmetrically in the peripheral side wall 16. This arrangement leaves two relatively large solid areas 30 and 32 and two relatively narrow solid areas 34 and 36 of the peripheral wall 16.

The upper open end of the lower carrier portion 12 is provided with an outwardly flared surface 38 terminating at the edge 20.

The upper end of the lower carrier portion is also provided with a pair of outwardly projecting ears 40, 42 located diametrically opposed to each other about the circumference of the peripheral side wall 16. The outwardly molded projections or ears serve to create a pair of U-shaped recesses 44, 46, respectively, which open toward the interior of the lower carrier portion 12. Each of these recessed areas 44, 46 is generally U-shaped and terminates at the upper peripheral edge 20.

Projections 48, 50, project horizontally outwardly or away from the ears 44, 46, respectively. The projections 48, 50 each include elongated stem portions 52, joined at one end to the ears 40 and 42, and at the other end to an enlarged head portion 54. It will be appreciated that the projections 48, 50, comprise bails for detachably securing the upper carrier portion to the lower carrier portion as will be described further hereinbelow.

The lower closed end of the lower carrier portion 12 includes an annular rim 58 depending from the bottom wall IB to provide a rigid bottom support for the carrier.

Figure 6:
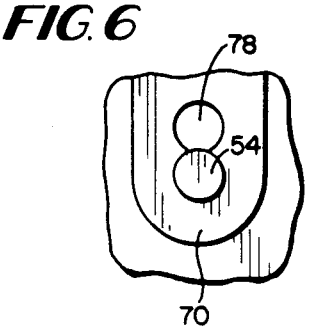
FIG. 6 is a partial detail showing the upper carrier portion attached to the lower carrier portion in a second position where pivotal movement therebetween is prevented.
Figure 5:
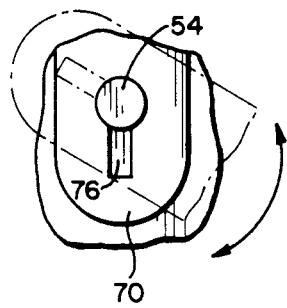
FIG. 5 is a partial detail showing the upper carrier portion attached to the lower carrier portion in one position permitting pivotal movement of one relative to the other.

The upper carrier portion 14 includes a pair of elongated flexible strap portions 62, 64 which extend from opposite sides of a container neck engaging portion 66. Lower free ends 68, 70 of the strap portions 62, 64, respectively, are provided with apertures 72, 74 which are adapted to be received over the projections 48, 50 respectively. Each aperture 72, 74 includes an elongated slot portion 76 and an enlarged, circular head portion 78. As shown in FIGS. 5 and 6, in a first orientation (FIG. 5), the elongated slot portion 76 is located below the enlarged head portion 78 so that the strap portions 62, 64 may be fitted over the enlarged head portions 78. As best seen in FIG. 5, when the circular portions 78 of the apertures 72, 74 are slipped over the enlarged head portions 54 of the projections 48, 50, respectively, the upper carrier portion 14 is free to pivot about an axis A which extends through the centers of head portions 54 of the projections 48, 50. When the strap portions 62, 64 are pulled upwardly, the elongated stem portions 52 of the projections 48, 50 are received within the slot portions 76 of the apertures 72, 74 to, in effect, lock the upper carrier portion 14 against any rotational movement relative to the lower carrier portion 12. The manner in which the upper carrier portion 14 is manipulated relative to the lower carrier portion 12 during use of the invention is described further below.

Figure 4:
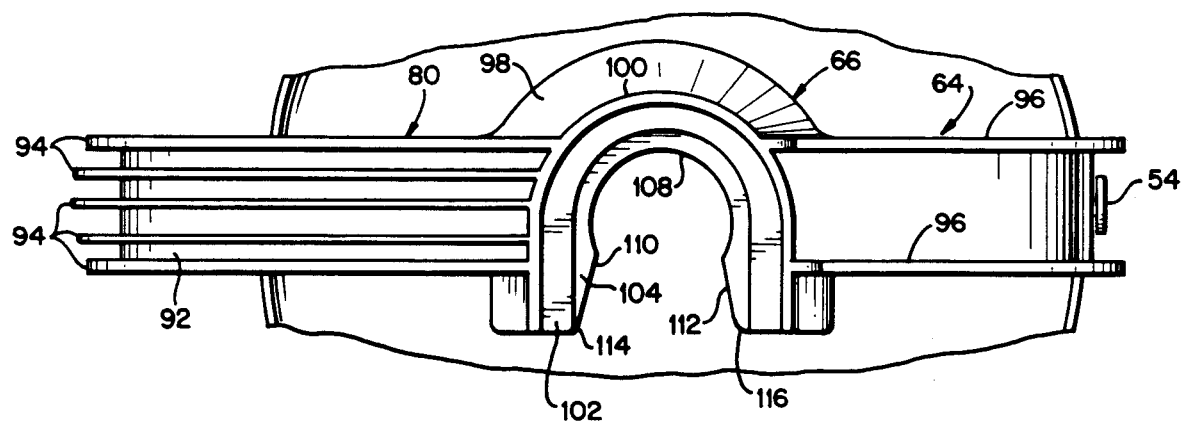
FIG. 4 is a partial plan view of the upper carrier portion shown in FIG. 3.
Figure 3:
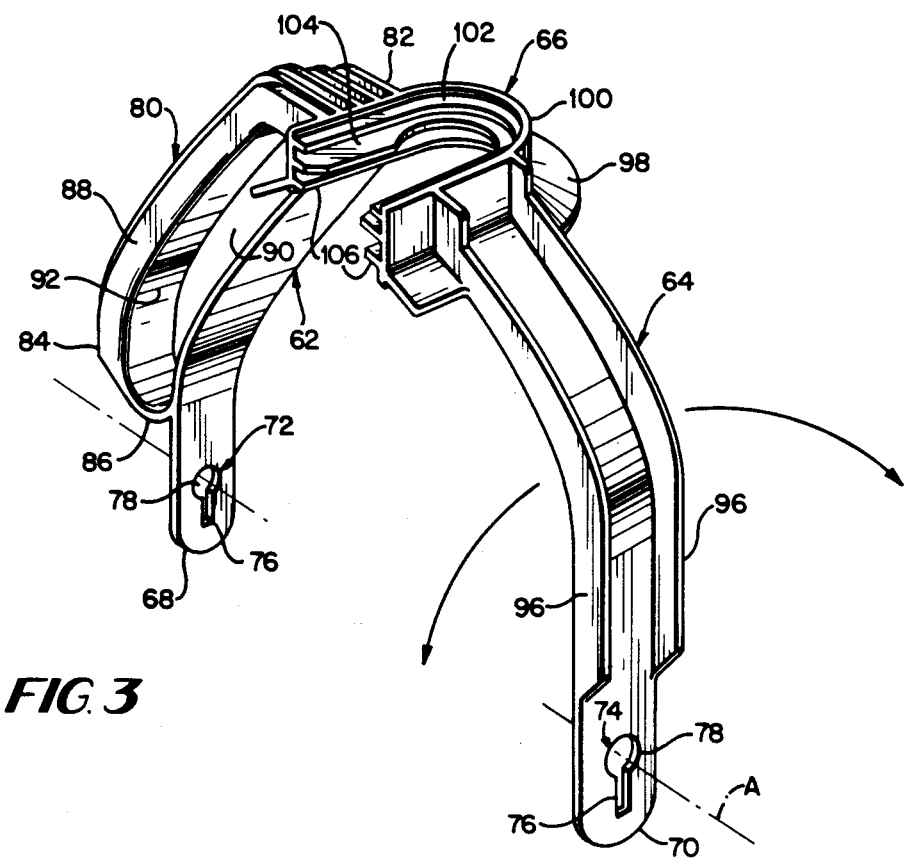
FIG. 3 is a perspective view of the upper carrier portion of the assembly shown in FIG. 1.
Figure 8:
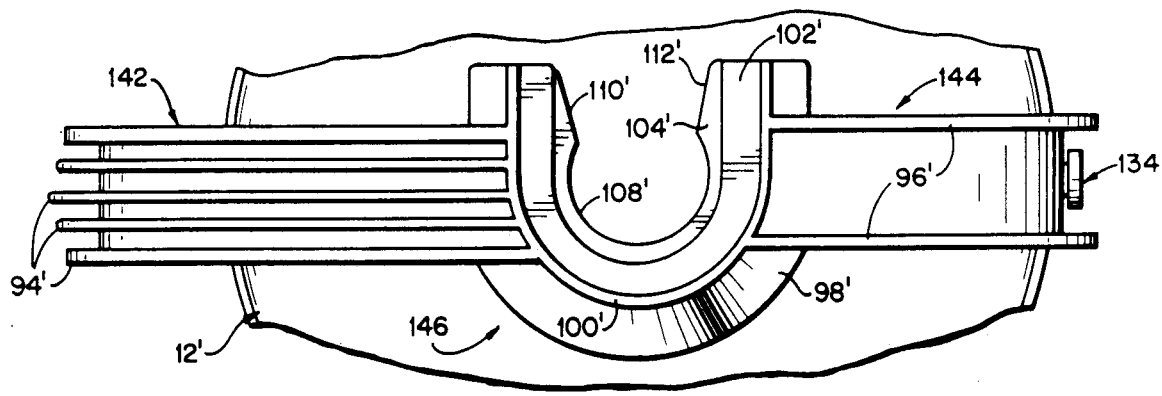
FIG. 8 is a partial plan view of the upper carrier portion shown in FIG. 7.

With reference now particularly to FIGS. 1, 3 and 4, the strap portion 62 has a handle 80 integrally formed therewith. Specifically, in this exemplary embodiment, the upper end 82 of the handle is joined to the container neck engaging portion 66 immediately above the merger of the strap portion 62 with the neck engaging portion 66. The lower end 84 of the handle includes a reverse curve 86 which merges into the strap portion 62. The intermediate or gripping portion 88 of the handle 80 is spaced away from the strap portion 62 to thereby form a closed loop which defines a handle opening 90.

The gripping portion 88 is formed by a relatively smooth surface 92 and a plurality of ribs or vanes 94 which extend substantially perpendicularly away from the surface 92. It will be appreciated that the handle 80 may have various other surface configurations which are nevertheless to be considered within the scope of this invention.

The other strap portion 64 is generally channel shaped, including a pair of upstanding side walls 96 extending along either side of the strap portion 64, and terminating at the lower end, above the aperture 74. These side wall surfaces terminate at the upper end of the strap portion 64 where they join with the container neck engaging portion 66.

The container neck engaging portion 66 is of generally inverted U-shape, depending on the direction of observation. For purposes of consistency, the container neck engaging portion will be considered to have a substantially inverted U-shape in plan, as viewed in FIG. 4. It is important to note that the neck engaging portion 66 opens in a direction substantially perpendicular to the axis A. This arrangement permits the upper carrier portion 14 to be rotated about the axis A into and out of a container neck engaging position as described below.

The neck engaging portion 66 is formed with a tapered collar portion 98 which joins to a substantially vertical wall 100. The interior surface of the wall 100 is provided with three vertically spaced, horizontal ribs 102, 104 and 106. The upper and lower ribs 102, 106 have substantially identical shapes, corresponding substantially to the curvature of the vertical wall 100.

As best seen in FIG. 4, the intermediate rib 104 has a first arcuate portion 108 which has an arcuate surface, the radius of curvature of which substantially corresponds to the adjacent radius of curvature of the container neck. At opposite ends of the arcuate portion 108 are flared portions 110, 112 with bevelled entry portions 114, 116, respectively, which serve as guide edges during pivotal movement of the upper carrier portion 14 into the container neck engaging position. As will be appreciated from FIG. 4, the rib 104 extends radially inwardly a greater extent than either of the upper and lower ribs 102, 106. This arrangement permits the series of ribs 102, 104, 106 to generally conform to the container neck as best seen in FIG. 1. In addition, the arcuate portion 108 extends circumferentially greater than 270° so that, upon engagement with a container neck of similar diameter, the upper carrier portion 14 may be snapped into place about the container neck.

The container 15 may be substantially as shown and described in my above identified parent application Ser. No. 07/432,672 with slight variations in shape as described below. Briefly, the container 15 includes a peripheral side wall 118, a bottom wall 120 and a tapered or domed shoulder 122 terminating at an upstanding neck or dispensing portion 124. The container may include a textured reinforcing area 126 extending about the periphery of the container where the side wall 118 merges with the shoulder 122. The neck 124 includes a pronounced radially outwardly directed flange 126 (which may be solid or hollow). From FIG. 1, it may be appreciated that the ribs 102, 104 and 106 engage the neck 124 below the flange 126, with the upper rib 106 providing some support for the container 15 as a whole by engaging the underside of the flange 126.

It will further be appreciated that the firm engagement of stems 54 in slots 76 in combination with the snug engagement of neck 124 in the container neck engaging portion 66 of the upper carrier 14 will result in a secure holding arrangement between the container 15 and container carrier 10, permitting easy pouring without fear of any undesirable relative movement between the container and carrier. The neck portion 124 terminates at a closure receiving area 128 which may include exterior threads for receiving a conventional screw-on type closure (not shown).

In use, it will be appreciated from the above description that, when the upper carrier portion 14 is attached to the lower carrier portion 12 with head portions 54 of projections 48, 50 in the enlarged portions 78 of apertures 72, 74, the upper carrier portion may be pivoted about axis A to a container loading/unloading position. Upon insertion of a filled container 15 into the lower carrier portion 12, the upper carrier portion may then be pivoted to a container engaging position, with the container neck engaging portion 66 in full engagement with the container neck 124 as shown in FIG. 1. The upper carrier portion 14 may then be pulled or flexed upwardly, sufficiently to engage stems 52 of projections 48, 50 in the slot portions 76 of apertures 72, 74 to thereby temporarily lock the upper carrier portion into place, precluding any pivotal movement of the upper carrier portion relative to the lower carrier portion.

Turning now to FIGS. 7-12, a second exemplary and preferred embodiment of the subject invention is illustrated. Elements in common with the first described embodiment, are referred to in FIGS. 7-12 of the drawings with the same numerals but with a prime designation attached.

In this second embodiment, the container carrier 130 includes a lower carrier portion 12' which is substantially identical to the lower carrier portion 12 of the embodiment illustrated in FIGS. 1-6 with certain exceptions noted below. Thus, the lower carrier 12' includes a peripheral side wall 16', an upper peripheral edge 20' and an outwardly flared surface 38' terminating at the edge 20'. The lower carrier portion 12' is also provided with a pair of outwardly projecting ears 40', 42' located diametrically opposed to each other about the circumference of the peripheral side wall 16'. These outwardly molded projections or ears serve to create a pair of U-shaped recesses similar to those shown at 44, 46 in the embodiment illustrated in FIGS. 1-6.

In this second exemplary embodiment, a pair of pivot pins 132, 134 (see FIGS. 7 and 10) project horizontally outwardly or away from the ears 40', 42', respectively. The pivot pins 132, 134 each include a round stem portion 136 and an enlarged head 138.

The projecting ears 40', 42' are also formed with a pair of detents or depressions 140 which, as shown in FIG. 9, are located at the 12 o'clock and 3 o'clock positions. The projections 132, 134 and the detents or depressions 140 are intended for use in the attachment of the upper carrier portion 14' as will be described further hereinbelow.

The upper container carrier portion 14' includes a pair of elongated flexible strap portions 142, 144 which extend from opposite sides of the container neck engaging portion 146. Lower free ends 148, 150 of the strap portions 142, 144, respectively, are provided with slots 150, 152 which are adapted to be slidably engaged behind the head portions 138 of the pivot buttons 132, 134, respectively. Each slot 150, 152 includes an entry portion 154 opening to one side of the respective strap, and an arcuate inner portion 156, into which the round stem portions 136 of pins 132, 134 may be snapped in a snug friction fit. Directly above the slots 150, 152, there is formed on the inner surface of each strap 142, 144 a bump or projection 158 for a purpose described below.

Figure 7:
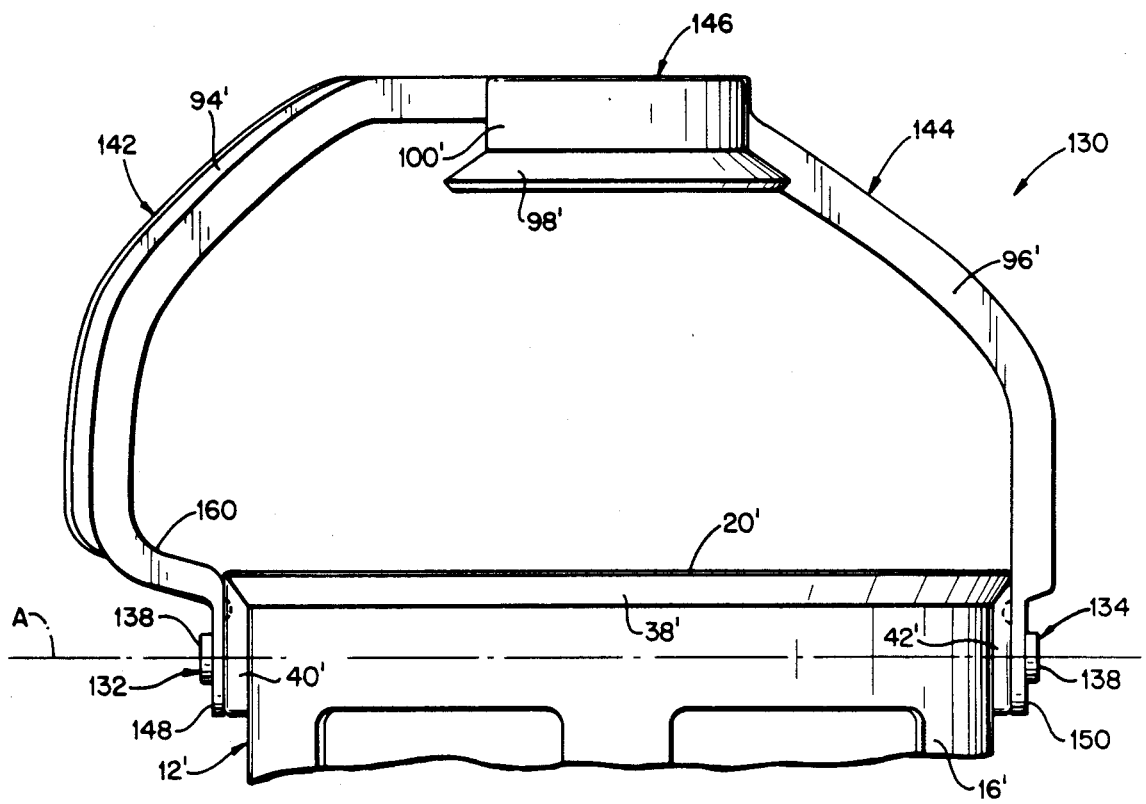
FIG. 7 is a partial side elevation of a carrier assembly in accordance with another exemplary embodiment of the invention.

As best seen in FIGS. 7, 9 and 10, when the slots 150, 152 are slidably engaged behind the heads 138 of the pivot pins 132, 134, respectively, and when the upper carrier portion 130 is in an upright and container engaging position, the bumps or projections 158 will be engaged within the depressions 140 at the 12 o'clock position to thereby secure the upper carrier portion in place.

It will be appreciated, however, that with the exertion of force against the upper carrier portion 130, the upper carrier portion may be pivoted to a second container loading/unloading position wherein the container neck engaging portion 146 has been rotated away from the container 15 (not shown in FIGS. 7-12) to facilitate loading and unloading of the latter.

In rotating the upper carrier portion 130 to the container loading/unloading position, the bumps or projections 158 will disengage from the depression 140 at the 12 o'clock position and will engage a similar depression 140 at the 3 o'clock position to thereby hold the upper carrier portion in the container loading/unloading position.

With reference now particularly to FIGS. 7 and 11, it will be appreciated that the strap 142 also comprises an integral handle. In order to provide sufficient room for the user to insert his/her fingers between the handle and the container, the strap portion 142 is curved away from the container 15 at its lower portion, as indicated at numeral 160 in FIG. 7. The remainder of the strap 142, with the exception of the use of slots 150, 152 and projections 158, is otherwise similar in construction to the handle portion 92 of the strap 62 illustrated in the embodiment of FIGS. 1-6, including the utilization of vertical ribs 94'.

The other strap portion 144 is similar to the strap portion 64 of the first described embodiment, again with the exception of the use of slots 150, 152, and projections 158 rather than apertures 72, 74.

The container neck engaging portion 146 of the second exemplary embodiment is substantially identical in construction to the container neck engaging portion 66 of the embodiment illustrated in FIGS. 1-6. The principal difference lies in the reorientation of the container neck engaging portion 146 to face in the opposite direction from that of the embodiment illustrated in FIGS. 1-6. The construction is otherwise identical and need not be described in further detail.

In use, the second exemplary embodiment differs from the first embodiment only in the manner of attachment of the upper carrier portion 14' to the lower carrier portion 12'. In this exemplary embodiment, after the stems 136 of the pivot buttons 132, 134 have been snapped into the curved portions 156 of slots 150, 152, the upper carrier portion 14' may be pivoted between the container loading/unloading position and the container neck engaging position as in the first described embodiment. Here, however, it is the cooperation between projections 158 and detents 140 which releasably retain the upper carrier portion in either of the two above described positions.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A container carrier assembly comprising:
   (a) a lower carrier portion including a peripheral sidewall, a bottom wall, and an upper peripheral edge; and
   (b) a pivotable upper carrier portion including a pair of strap portions detachably secured at first ends to said lower container carrier portion at diametrically opposed locations and terminating at a container neck engaging portion integrally formed between second ends of said strap portions.

2. The container carrier assembly of claim 1 wherein said lower carrier portion is provided with a pair of projections extending outwardly therefrom at said diametrically opposed locations, and wherein said first ends of said strap portions are provided with openings adapted to receive said projections.

3. The container carrier assembly of claim 2 wherein each of said projections includes a relatively narrow shank portion joined at one end to said lower carrier portion and at the other end to an enlarged head portion.

4. The container carrier assembly of claim 3 wherein each of said projections includes a closed periphery aperture having a relatively narrow slot portion and an enlarged head portion.

5. The container carrier assembly of claim 4 wherein each said enlarged head portion is located above each said narrow stem when said upper portion is in a container neck engaging position, such that each said narrow slot portion receives a corresponding one of said narrow stem portions of said projections.

6. The container carrier assembly of claim 3 wherein each of said openings includes a slot opening toward a side edge of said strap.

7. The container carrier assembly of claim 1 wherein said lower container carrier portion is formed with outwardly projecting ears at said diametrically opposed locations.

8. The container carrier assembly of claim 1 wherein one of said straps comprises a handle.

9. The container carrier assembly of claim 1 wherein one of said straps includes an integral handle portion.

10. The container carrier assembly of claim 9 wherein said handle portion comprises an elongated strip joined at one end to said container neck engaging portion and at the other end to said one of said strap portions adjacent said first end thereof.

11. The container carrier assembly of claim 1 wherein said container neck engaging portion in plan has a substantially inverted U-shape, opening in a direction toward a side of said lower carrier portion intermediate said diametrically opposed locations.

12. The container carrier assembly of claim 11 wherein said substantially inverted U-shaped section opens in a direction substantially perpendicular to an axis passing through said diametrically opposed locations.

13. The container carrier of claim 11 wherein said inverted U-shaped section comprises at least one substantially horizontally extending rib.

14. The container carrier assembly of claim 13 and wherein said inverted U-shaped section includes second and third container neck engaging ribs located above and below said at least one rib, wherein said first, second and third ribs are adapted to engage vertically spaced portions of an associated container neck.

15. The container carrier of claim 13 wherein said rib includes a first portion having a radius of curvature substantially equal to a corresponding radius of curvature of said container neck, and second portions extending from opposite ends of said first portion.

16. The container carrier of claim 15 wherein said first portion has an extent of at least 270°.

17. A container carrier assembly comprising:
(a) a lower portion including a peripheral sidewall, a bottom wall and an upper peripheral edge, said lower portion having bails projecting radially outwardly therefrom at diametrically opposed locations adjacent said upper peripheral edge;
(b) an upper portion including a pair of straps each provided with a profiled opening at a first end and joined to a container neck engaging portion at a second end; said profiled openings and said bails shaped to enable said upper portion to pivot relative to said lower portion between a first loading position and a second container neck engaging portion, and to restrain pivotal movement relative to said lower portion in said second position.

18. The container carrier assembly according to claim 17 wherein said container neck engaging portion has a substantially inverted U-shape in plan, and opens in a first direction, and wherein said straps extend away from said container neck engaging portion in second directions substantially perpendicular to said first direction, to thereby enable said upper container portion to pivot between said first and second positions.

19. The container carrier according to claim 17 wherein said container neck engaging portion comprises a substantially vertical wall and a first substantially horizontal container engaging rib projecting inwardly from said vertical wall.

20. The container carrier according to claim 19 wherein said first container engaging rib includes a first portion having a radius of curvature substantially equal to a corresponding radius of curvature of said container neck; and second portions extending away from said container neck at opposite ends of said first portion.

21. The container carrier according to claim 20 and wherein said container neck engaging portion includes second and third container neck engaging ribs above and below said first container engaging rib, and projecting inwardly from said vertical wall.

22. The container carrier according to claim 17 and further including a handle portion formed integrally with one of said strap portions.

23. The container carrier according to claim 17 wherein said upper and lower portions are constructed of relatively rigid plastic material.

24. The container carrier according to claim 17 wherein said lower portion has a plurality of cut-outs in said peripheral wall.

25. A container and carrier assembly comprising:
(a) a container carrier including a lower carrier portion having a peripheral sidewall, a bottom wall, and an upper peripheral edge; an upper carrier portion pivotably secured at first ends to said lower carrier portion at diametrically opposed locations, and including a container neck engaging portion; and a carrying handle; and
(b) a flexible and collapsible container adapted to be carried by the carrier assembly and having a relatively thin peripheral side wall, a bottom wall and a top wall, said top wall having an integrally formed neck portion including closure receiving means formed thereon.

26. The container and carrier assembly according to claim 25 wherein said lower and upper carrier portions are provided with cooperable means for permitting said upper carrier portion to pivotably move between a first container loading position and a second container neck engaging position.

27. The container and carrier assembly according to claim 26 wherein said cooperable means includes a pair of detents formed in said lower carrier portion at each of said diametrically opposed locations, and a projection formed in each of said first ends of said upper carrier portion for frictional engagement with one or the other of a corresponding one of said pair of detents.

28. The container and carrier assembly according to claim 27 wherein one of said detents of each said pair of detents at each of said diametrically opposed locations is engaged by an associated one of said projections when said upper carrier portion is in a first container neck engaging position; and the other of said detents of each said pair of detents at said diametrically opposed locations is engaged by said associated one of said projections when said upper carrier portion is in a second container loading/unloading position.

29. The container and carrier assembly according to claim 26 wherein said cooperable means permits said upper carrier portion to be releasably held in said second position.

30. The container and carrier assembly according to claim 25 wherein said container is provided with a radially outwardly extending flange in said neck portion, adapted to be supported within said container neck engaging portion of said carrier upper portion.

* * * * *